3,711,364
SAFETY GLASS
Leo Ahramjian, Wilmington, Del., assignor to E. I. du Pont de Nemours and Company, Wilmington, Del.
No Drawing. Continuation-in-part of abandoned application Ser. No. 631,623, Apr. 18, 1967. This application Mar. 20, 1970, Ser. No. 21,543
Int. Cl. B32b 17/04, 27/40
U.S. Cl. 161—190                                          3 Claims

ABSTRACT OF THE DISCLOSURE

A safety glass wherein two layers of glass have an interlayer disposed between them of polyurethane elastomer of (a) polytetramethylene ether glycol having a number average molecular weight of about 800 to 2000, (b) 1,4-butanediol, and (c) 2,4-tolylene diisocyanate or mixtures thereof containing up to about 35 weight percent 2,6-tolylene diisocyanate, the quantities of reactants being about 2 to 3.5 moles of butanediol per mole of said glycol, and approximately equivalent amounts of said diisocyanate.

CROSS REFERENCE

This application is a continuation-in-part of U.S. application, Ser. No. 631,623, filed Apr. 18, 1967 (now abandoned), and is filed pursuant to a restriction requirement issued in said application.

BACKGROUND OF THE INVENTION

This invention relates to a safety glass improved by the use of an interlayer of a polyurethane elastomer.

Some safety glass laminated structures, particularly the five-layered type, are designed for structural support as load-bearing members in use. For example, Saunders U.S. Pat. 3,388,032 discloses a safety glass of a sheet of polycarbonate sandwiched between sheets of polyurethane which are in turn sandwiched between sheets of glass. Although such safety glass has its particular use, namely as a load-bearing member, it is overdesigned and expensive to use in applications where it is not needed as a load-bearing member. Therefore, it is desirable to resort to a three-layered safety glass incorporating only a single inexpensive interlayer.

It is known that certain plastic materials can be used as a single safety glass interlayer. Some known materials are polycarbonate and polyvinyl butyral. Polycarbonate has been found to be deficient as a safety glass interlayer because it has insufficient bond strength between the polycarbonate and the glass and also because the polycarbonate and glass have different coefficients of thermal expansion causing the safety glass to crack and craze on cooling from the temperatures necessary to laminate the safety glass together. Plasticized polyvinylbutyral, on the other hand, provides sufficient adhesion and has sufficient elasticity to compensate for differences in thermal expansion. However, safety glass prepared having a polyvinylbutyral interlayer has a range of use temperature more narrow than desired in which penetration resistance is optimum.

Therefore, there is a need for an inexpensive safety glass interlayer having good adhesive qualities, good light transmission properties and good penetration resistance over a broader range of use temperature that can be readily formed into a sheet to be used directly in the conventional process for the manufacture of safety glass.

It is well known that polyurethanes in general have been employed in glass laminates. Prior art in the field of polyurethanes particularly related to this application is disclosed in Hill, U.S. Pat. 2,929,800; Schollenberger, U.S. Pat. 2,899,411; and Ammons et al., Canadian Pat. 673,678.

Hill broadly discloses a polyurethane prepared from (a) a polyalkylene ether glycol having a molecular weight of at least 750, (b) a molar excess of an organic diisocyanate, and (c) a chain-extending agent. The composition is not suggested for use in safety glass and no prescription of critical quantities is given to render the composition useful in safety glass.

Schollenberger relates to the preparation of polyurethanes by mixing (a) one mole of a poly(polymethylene oxide) having a molecular weight of 800 to 4000 with (b) .5 to 9 moles of a saturated aliphatic glycol which includes 1,4-butanediol and (c) 1.5 to 10 moles of a diphenyl diisocyanate. Schollenberger indicates rather negative results when tolylene diisocyanate is substituted for the diphenyl methane diisocyanate.

Ammons et al. discloses a polyurethane prepared from a polytetramethylene ether glycol/diisocyanate prepolymer with a curing system comprising a diol and a polyol such as trimethylol propane. In conventional use as a safety glass interlayer, a polymer is formed into a sheet and laminated to the glass by pressing the polymer sheet between the glass layers under heat. The thermoplastic properties of the interlayer permit it to flow, adhere to the glass, and regain its properties upon cooling. The use of trimethylol propane in the Ammons et al. polyurethane causes it to lose its thermoplastic characteristics rendering the polyurethane unusable in sheet form for preparing safey glass conventionally.

The inability to use diisocyanates such as tolylene diisocyanate or a requirement for a polyol such as trimethylolpropane involves technical and economic disadvantages. Despite the amount of prior art in this particular polyurethane field, there is no suggestion as to how these technical and economic disadvantages can be eliminated while obtaining properties making the polyurethane desirable for use as a safety glass interlayer.

SUMMARY OF THE INVENTION

Accordingly, the present invention provides a safety glass wherein two layers of glass have an interlayer disposed between them of a polyurethane elastomer which consists essentially of (a) polytetramethylene ether glycol having a number average molecular weight of about 800 to 2000, (b) 1,4-butanediol, and (c) 2,4-tolylene diisocyanate or mixtures thereof containing up to about 35 weight percent 2,6-tolylene diisocyanate; and quantities of reactants being about 2 to 3.5 moles of butanediol per mole of said glycol, and approximately equivalent amounts of said diisocyanate.

DESCRIPTION OF PREFERRED EMBODIMENT

One of the ingredients in the polyurethane elastomer is polytetramethylene ether glycol (hereinafter PTMEG). This glycol is well known to those skilled in the art and is described more particularly in Hill, U.S. Pat. 2,929,800; and Ballard, U.S. Pat. 2,492,955. For the purposes of this invention, the number average molecular weight should be between about 800 and 2000; however, molecular weights ranging from about 800 to 1300 are particularly preferred. While polypropylene ether glycol is widely used in polyurethane elastomers, it is found that use thereof in this invention has an adverse effect on the low temperature properties when the polyurethane is employed for interlayers in windshield safety glass.

This polyurethane elastomer requires from about 2 to about 3.5 moles of 1,4-butanediol per mole of PTMEG; however, it is preferred to use at least 2.5 moles, but less than about 3 moles, of butanediol per mole of PTMEG.

The diisocyanate is 2,4-tolylene diisocyanate or mixtures thereof with 2,6-tolylene diisocyanate wherein the mixture contains up to about 35 weight percent of the 2,6-isomer. The tolylene diisocyanate will be present in amounts approximately equivalent to the total moles of butanediol and PTMEG. The exact amount of tolylene diisocyanate one uses depends on the viscosity or molecular weight desired for the product. For both shoe-sole and windshield applications, about 98% of theory for tolylene diisocyanate is preferred since a very high molecular weight product is not preferred.

It is important that the PTMEG and the 1,4-butanediol be reacted simultaneously with the diisocyanate. Prepolymers wherein all of the PTMEG is reacted with the diisocyanate and the diol is added subsequently have been found to have objectionably high viscosities and melting points and are insufficiently soluble in solvents. These properties render such a polyurethane unsuitable for use in safety glass interlayer lamination because of the high molding temperatures required, and unsuitable for use in adhesives because suitably concentrated solutions cannot be prepared.

The polyurethane of this invention can be prepared by prepolymer techniques as long as the PTMEG and the butanediol are both present in prepolymer formation. In making a prepolymer according to this invention, it is desired that the mole ratio of diol of PTMEG range from about 2:1 to 3:1 and the mole ratio of diisocyanate to the sum of the moles of PTMEG and diol range from about 2:1 to 2.33:1 during the prepolymer formation with the remainder of the recipe added thereafter.

It is also quite suitable to prepare the poyurethanes of this invention by a one-shot technique wherein all the ingredients are added simultaneously. Details of such a procedure will be apparent from the examples hereinafter.

The polyurethane of this invention can be prepared in a solvent, e.g., methyl ethyl ketone. It is usual to add all three ingredients to the solvent together with a catalyst such as dibuyl tin dilaurate and conduct the polymerization until the molecular weight of the polymer is such that the 35 weight parts of the elastomer in 65 parts of methyl ethyl ketone and 1 part methanol exhibits a Brookfield viscosity between about 10,000 and 100,000 cps. at 25° C. It is also usual when polymerizing in a solvent to stop the reaction at the desired viscosity by the addition of a monohydric primary alcohol of up to about 3 carbon atoms, i.e., ethanol, methanol or n-propanol.

Other suitable catalysts for this reaction are lead naphthenate, cobalt naphthenate and mixtures of dibutyl tin dilaurate and triethylene diamine. When the reaction is carried out in a solvent, use of catalyst is highly desirable since the dilution lowers the reaction rate and the polarity of the solvent tends to solvate the glycols and render them less reactive. Suitable solvents include those inert to isocyanates which are also capable of dissolving from about 20 to 40 weight percent of polyurethane elastomer solids, e.g., methyl ethyl ketone, acetone, tetrahydrofuran, and ethyl acetate. When the polyurethane is made by the solvent process, it can be used as is for a solution adhesive or the solvent can be evaporated to give a solid polyurethane.

The polyurethane elastomer of this invention has been found to be very suitable for producing safety glass wherein a sheet of the polyurethane, e.g., about 0.015 to 0.05 inch in thickness is laminated between two pieces of glass. Since the preparation of the elastomers of the invention can be effected with the relatively inexpense tolylene diisocyanates without the necessity for additional, expensive components, their utility is greatly enhanced.

The invention will now be described in connection with examples of specific embodiments thereof wherein parts and percentages are by weight unless otherwise indicated.

Example 1

To a mixture of (a) 3450 grams of polytetramethylene ether glycol having a number average molecular weight of 986 (3.5 moles) and (b) 788 grams of anhydrous 1,4-butanediol (8.75 moles) contained in a 12-liter flask is added 2136 grams of a mixture of isomers (80% 2,4-; 20% 2,6-) of tolylene diisocyanate (12.25 moles). The diisocyanate addition is made as rapidly as possible and the contents of the flask are agitated and degassed for about two to three minutes by reducing the pressure with a vacuum pump. The temperature of the mixture increases from room temperature to about 120° C. during the degassing due to heat evolved from the reaction. The contents of the flask are then poured into a lubricated, preheated 24 in. x 36 in. x 8 in. aluminum mold forming a polyurethane polymer which is held at 100° C. for 16 hours. After cooling to room temperature, the polyurethane polymer is removed from the mold.

The polyurethane polymer prepared in this example typically has an inherent viscosity of about 0.7 to 1.2 in tetrahydrofuran and a solution containing 18.4% by weight of polymer in tetrahydrofuran typically has a Brookfield viscosity of about 300 to 3000 cps. at room temperature.

Example 2

Films about 12 in. x 12 in. x 0.026 in. of an elastomer prepared as in Example 1 are made by compression molding. The required weight of resin is placed in a mold consisting of "Teflon"[1]-coated platens and a 12 in. x 12 in. chase, heating the mold for ten minutes at 165° C. with just sufficient pressure to maintain contact between the resin and the platens, raising the pressure to 20 tons total force on same for three minutes to fill the mold uniformly and then cooling by circulating tap water through the press platens until the temperature reaches 30° C. The films are conditioned by subjecting them to an atmosphere of 23% relative humidity, then are laminated between 12 in. x 12 in. plates of ⅛ in. glass by placing the assembly between blotter cushions in a steam-heated press at 175° C., maintaining about 35 p.s.i. (3½ in. ram) pressure for six minutes, increasing the pressure to 2000 p.s.i. for four minutes, and then cooling under pressure. The laminates are autoclaved for nine minutes at 135° C. and 225 p.s.i. in an oil autoclave.

The laminates produced are transparent and have excellent color. The laminates are conditioned to 0° F., 73° F., and 120° F. and tested for penetration resistance and integrity by dropping a five-pound steel ball from various heights on the laminates supported in a horizontal frame (American Standards Association Test Z-26). At 0° F., the ball typically does not penetrate (i.e., it is stopped and supported by the fractured laminate) at 18 feet, 19 feet, 20 feet, or 21 feet, but does penetrate at 22 feet. At 73° F., the ball does not penetrate at 14 feet, 16 feet, or 18 feet, but does penetrate at 20 feet. At 120° F., the ball does not penetrate at five feet or six feet but does penetrate at seven feet. Very little or no glass is detached from the interlayer in the impact tests. The impact performance is judged to be better in respect to standard plasticized polyvinyl butyral interlayer performance.

Example 3

A polyurethane elastomer such as that prepared in Example 1 is skived into 12 in. x 12 in. x 0.030 in. sheets from cast blocks. They are conditioned by subjecting them to an atmosphere of 23% relative humidity and are laminated by placing the interlayer-glass assembly for one minute in a 200° C. oven, passing the sandwich between rolls, heating in the oven for three minutes, passing between rolls, heating again for three minutes and rolling, and then autoclaving this "prepress" for nine minutes at 135° C. and 225 p.s.i. in an oil autoclave. The laminates have good color and transparency. When tested in accordance with the test described in Example 2 at 0° F., the laminates are not penetrated at 28 feet (the greatest

---

[1] Registered trademark.

height attempted); at 73° F. samples support the ball at 20 feet, but do not support the ball at 21 feet; and at 120° F., samples support the ball at six feet, but are penetrated at seven feet. Glass adhesion in the impact test is excellent.

Example 4

In accordance with the procedure of Example 1, four polymers are prepared wherein the molar amounts of 1,4-butane-diol (BDO) per mole of polytetramethylene ether glycol (PTMEG) are 2.0, 2.5, 3.0, and 3.5, respectively.

These polymers are tested in accordance with the procedure of Example 2 wherein the polymers are formed into sheets, laminated between two pieces of glass and tested by simulating their use as a windshield safety glass wherein the laminated structure is tested for penetration resistance by dropping a five-pound steel ball (simulating a human head) at various temperatures (simulating the change in atmospheric temperature) from various increasing heights until full penetration occurs. The laboratory data obtained by testing is tabulated below in Table I. Also tabulated below are the breaking heights of a commercial standard, plasticized polyvinyl butyral submitted for purposes of comparison.

TABLE I

| Molar ratio, BDO/PTMEG | Breaking height, feet | | |
|---|---|---|---|
| | 0° F. | 73° F. | 120° F. |
| 2.0 | 11 | 11 | 4.0 |
| 2.5 | 21 | 19 | 6.5 |
| 3.0 | 12 | 23 | 9.5 |
| 3.5 | 8 | 12 | 10.0 |
| Commercial standard plasticized polyvinyl butyral | 7 | 16 | 6.0 |

The data show the criticality of the molar ratio of 1,4-butanediol to polytetramethylene ether glycol. It shows that at a BDO/PTMEG ratio of 2 the polymer while still useful begins to show a marked decrease in penetration resistance at high temperatures and at a BDO/PTMEG ratio of 3.5 the polymer begins to show a marked decrease in penetration resistance at low temperatures. The polymer compositions of the present invention compare favorably with or better than the standard at all temperatures tested.

Example 5

In accordance with the procedure of Example 1, three polymers are prepared wherein the molar amount of 1,4-butanediol (BDO) per mole of polytetramethylene ether glycol (PTMEG) is held constant at 2.5 and the molecular weight of the PTMEG is varied.

These polymers are tested in accordance with the procedure of Example 2 wherein the polymers are formed into sheets, laminated between two pieces of glass and tested by simulating their use as a windshield safety glass wherein the laminated structure is tested for penetration resistance by dropping a five-pound steel ball (simulating a human head) at various temperatures (simulating the change in atmospheric temperature) from various increasing heights until full penetration occurs. The laboratory data obtained by testing is tabulated below in Table II.

TABLE II

| Molar ratio, BDO/PTMEG | Molecular weight, PTMEG | Breaking height, feet | | |
|---|---|---|---|---|
| | | 0° F. | 73° F. | 120° F. |
| 2.5 | 670 | 8 | 9 | 18.0 |
| | 1,000 | 21 | 19 | 6.0 |
| | 2,050 | 20 | 4 | 1.5 |

The data show the criticality of the molecular weight of PTMEG. It shows that using a PTMEG with a molecular weight of 800, the polymer while still useful begins to show a marked decrease in penetration resistance at low temperatures and when using a PTMEG with a molecular weight of 2050 the polymer begins to show a marked decrease in penetration resistance at high temperatures.

I claim:

1. A safety glass comprised of two layers of glass having in interposed adherence therewith a preformed sheet interlayer of a polyurethane elastomer which consists essentially of the product of reacting
   (A) a polytetramethylene ether glycol having a number average molecular weight of about 800–2000,
   (B) 1,4-butanediol in an amount such that the B:A molar ratio is about 2.5:1 to 3:1, and
   (C) an isocyanate compound selected from the group: 2,4-tolylene diisocyanate and mixtures thereof with 2,6-tolylene diisocyanate containing up to about 35% by weight of the latter, the moles of component (C) being about equal to the total moles of (A) and (B), said safety glass being the product of heating and pressing an assembly wherein said preformed elastomer sheet is in interposed relation with said layers of glass.

2. A safety glass according to claim 1 wherein the molecular weight of component (A) is about 800–1300, and the ratio of the mols of component (C) to the total mols of (A) and (B) being about 98:100.

3. A safety glass according to claim 1 wherein said interlayer has a thickness of about 0.015–0.05 inch, and said elastomer is the product of reacting components (A) and (C) in the presence of component (B).

References Cited

UNITED STATES PATENTS

| 3,509,015 | 4/1970 | Wismer et al. | 161—190 |
| 3,341,391 | 9/1967 | Hamilton et al. | 161—190 X |
| 2,871,218 | 1/1959 | Schollenberger | 161—190 X |
| 2,968,575 | 1/1961 | Mallonee | 161—190 X |
| 3,356,650 | 12/1967 | McElroy | 161—190 X |
| 3,388,032 | 6/1968 | Saunders | 161—190 X |

FOREIGN PATENTS

| 673,678 | 11/1963 | Canada | 161—190 |

ROBERT F. BURNETT, Primary Examiner

C. B. COSBY, Assistant Examiner

U.S. Cl. X.R.

156—99, 106, 331; 161—165, 192; 260—77.5 A, 77.5 AM, 77.5 AT